(No Model.)

G. W. SMILLIE.
CAR COUPLING.

No. 508,441. Patented Nov. 14, 1893.

Witnesses.
W. H. Hayford
A. E. Hayes.

Inventor:-
Geo. W. Smillie
by Chas. F. Dane
his atty.

UNITED STATES PATENT OFFICE.

GEORGE W. SMILLIE, OF NEWARK, NEW JERSEY.

CAR-COUPLING.

SPECIFICATION forming part of Letters Patent No. 508,441, dated November 14, 1893.

Application filed August 20, 1892. Serial No. 443,607. (No model.)

*To all whom it may concern:*

Be it known that I, GEORGE W. SMILLIE, a citizen of the United States, and a resident of Newark, in Essex county and State of New Jersey, have invented new and useful Improvements in Car-Couplers, of which the following description, taken in connection with the drawings herewith accompanying, is a specification.

My present invention relates to the uncoupling mechanism for car-couplers, and is more especially adapted for use on passenger cars where the space in which it may be located and operated is limited, although it may be equally applicable to any style of car, the object of my invention being to lessen the number of parts usually employed in such mechanism and thereby lessen the cost of construction, and at the same time provide a simple and practical device or mechanism to produce the desired result in the most satisfactory and positive manner. This object I attain by the combination with the car or part thereof and the locking pin or device of the coupler, of a lever or series of levers constructed and arranged in a manner as will hereinafter be described in detail and pointed out in the claims.

Figure 1:
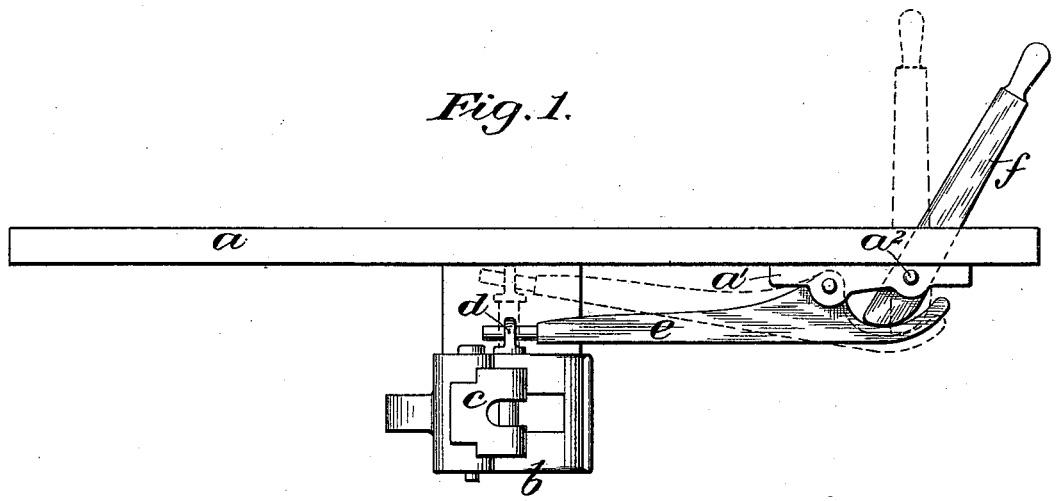
Figure 2:
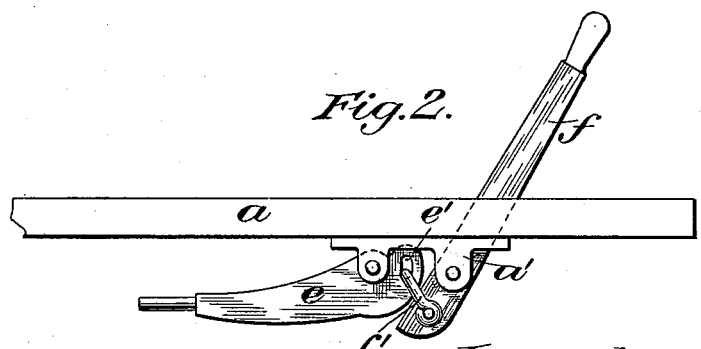

Referring to the drawings:—Figure 1, represents an end view of the platform of a car, showing a car-coupler and my improved uncoupling device or mechanism in position thereon, and Fig. 2, shows a portion of the platform with a modified form of uncoupling mechanism attached thereto.

To explain in detail,—$a$, represents the platform of a car, $b$ the draw-head of a coupler which is secured beneath the platform to the body of the car in the usual manner, $c$ the rotating hook or knuckle hinged to said draw-head, and $d$ the locking pin or bolt for engaging with the inner arm of said hook or knuckle to adjustably lock the latter in a closed position.

The construction and operation of the above mentioned parts being well known to those skilled in the art and not being of my present invention, I will not describe the same any further in detail herein.

According to my present invention, I provide a bar or lever $e$ and pivotally attach or secure the same to a block or bracket $a'$ on the under side of the platform. One end of this lever extends through an opening or slot formed in the upper end of the locking-pin $d$ to form a loose connection therewith, and at its opposite end the said lever is cut out to form a depression as shown, to receive the lower end of an operating lever $f$, which latter is pivotally secured on the platform of the car at $a^2$, and at its upper end projects above the platform in a convenient position to be grasped and operated by the brakeman or other operator as shown.

The lever $f$, when in a normal position, stands at an incline as shown in Fig. 1, and at its lower end is provided with a curved surface to conform to the engaging surface of the lever $e$. To raise the locking pin $d$ from engagement with the hook or knuckle $c$ to allow the latter to open and uncouple the cars, the lever $f$ is moved laterally to cause its lower end to depress the adjacent end of the lever $e$ and raise the opposite end of the latter and the connecting coupling-pin, as shown in dotted lines in Fig. 1. When the coupling-pin is thus raised and the hook or knuckle moved to an open position, the former is supported in its raised position on an arm of said hook, in a manner as set forth in a patent granted to me December 3, 1889, No. 416,187. In the present instance shown, the lever $c$ is pivoted at one side of its center, and the long end of the same has connection with the coupling-pin in order to produce an increased weight upon the coupling-pin to insure its dropping or moving down into position to engage with the hook or knuckle to lock the same, when it has been closed by the engagement of another coupler, in the usual manner. It is obvious however that the said lever might be pivoted at any suitable or convenient point, and the increased weight for acting on the coupling-pin be secured by increasing the size of that end of the lever or by connecting additional weight thereto.

Referring to Fig. 2, I have shown a somewhat different construction in the form of connection between the levers forming the uncoupling mechanism. In this instance I have arranged the lever $f$ to extend below the end of the part $e$ and have connected the same by a link $f'$, the slot or opening $e'$ in the part $e$ which receives the connecting link, being made elongated as shown, to allow for the movement of the lever $f$ which falls back to its normal position after the free end of the part $e$ and the connecting locking device $d$ have been elevated and supported in such elevated position in a manner as hereinbefore described. In lieu of the elongated slot as shown, I sometimes employ two or more links to form the connection between the parts and secure the same result.

I do not wish to be understood as confining myself to the particular form or manner of connection of the several parts as shown and described, as it is obvious that various modifications might be made without departing from the spirit of my invention.

Having thus set forth my invention, what I claim as new, and desire to secure by Letters Patent of the United States, is—

1. In a car-coupler, the combination with the locking-pin or device, of an uncoupling device, consisting of a pivoted lever having a loose connection at or near one end with the said locking device, and a pivoted lever for operating the former, both of said levers being arranged to operate or move independently of each other in one direction, substantially as described and for the purpose set forth.

2. In a car-coupler, the combination with the locking-pin or device, of an uncoupling device, consisting of a pivoted lever having a loose connection at or near one end with the said locking device, and a pivoted operating lever having a loose link connection with said former lever in a manner whereby both levers may move independently of each other in one direction, substantially as described and for the purpose set forth.

3. In a car-coupler, the combination with the locking-pin or device, of an uncoupling device, consisting of a pivoted lever having a loose connection at or near one end with said locking device, and a pivoted operating lever having a loose connection with said former lever through the medium of a slot or opening and connecting link, substantially as described and for the purpose set forth.

GEO. W. SMILLIE.

Attest:
    CHAS. F. DANE,
    A. L. HAYES.